United States Patent
Hurd et al.

(10) Patent No.: US 12,277,608 B2
(45) Date of Patent: *Apr. 15, 2025

(54) MACHINE LEARNING SYSTEM FOR SUMMARIZING TAX DOCUMENTS WITH NON-STRUCTURED PORTIONS

(71) Applicant: K1X, Inc., Chicago, IL (US)

(72) Inventors: Geralyn R. Hurd, Chicago, IL (US); Nathaniel J. Jones, Grand Rapids, MI (US); Camron Momeni, Chicago, IL (US); Justin A. Bass, Chicago, IL (US)

(73) Assignee: K1X, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/591,116

(22) Filed: Feb. 29, 2024

(65) Prior Publication Data

US 2024/0212061 A1    Jun. 27, 2024

Related U.S. Application Data

(63) Continuation of application No. 16/571,775, filed on Sep. 16, 2019, now Pat. No. 11,941,706.

(51) Int. Cl.
| | | |
|---|---|---|
| G06Q 30/00 | (2023.01) | |
| G06N 20/00 | (2019.01) | |
| G06Q 40/12 | (2023.01) | |
| G06V 30/19 | (2022.01) | |
| G06V 30/412 | (2022.01) | |
| G06V 30/10 | (2022.01) | |

(52) U.S. Cl.
CPC ........... *G06Q 40/123* (2013.12); *G06N 20/00* (2019.01); *G06V 30/19167* (2022.01); *G06V 30/19173* (2022.01); *G06V 30/412* (2022.01); G06V 30/10 (2022.01)

(58) Field of Classification Search
CPC .................................................. G06Q 40/123
USPC ...... 705/31, 1.1, 40, 34, 44, 30, 39; 704/240, 704/257, 9; 706/48
See application file for complete search history.

(56) References Cited

U.S. PATENT DOCUMENTS

| | | | | |
|---|---|---|---|---|
| 7,149,347 | B1 * | 12/2006 | Wnek ................... | G06V 30/416 |
| | | | | 382/209 |
| 9,418,385 | B1 * | 8/2016 | Wang ...................... | G06Q 40/10 |
| 10,140,277 | B2 * | 11/2018 | Unsal ..................... | G06N 20/00 |

OTHER PUBLICATIONS

ProQuestDialogNPL Search History.*

* cited by examiner

*Primary Examiner* — John H. Holly
(74) *Attorney, Agent, or Firm* — Barnes & Thornburg LLP (57) ABSTRACT

Technologies for summarizing tax documents that include an unstructured portion, such as K1 filings. The system extracts data from both the structured information, such as a K1 facepage, and unstructured information, such as white-paper statement(s). The system includes machine learning model(s) to determine the information to be extracted from the unstructured information. The machine learning model (s) generate a confidence level associated with the extracted unstructured information that represents a prediction on how likely the extracted unstructured information was accurately extracted. The system generates a document in an electronic interchange format that represents both the structured and unstructured information in the analyzed tax document.

16 Claims, 8 Drawing Sheets

| Schedule K-1<br>(Form 1065)<br>Department of the Treasury<br>Internal Revenue Service    For calender year 2018, or tax year<br>beginning [ / /2018 ] ending [ / / ]<br>2018 | ☐ Final K-1    ☐ Amended K-1    OMB No. 1545-0123 |
|---|---|

Partner's Share of Income, Deductions, Credits, etc.    See back of form and separate instructions.

| Part I | Information About the Partnership |
|---|---|
| A | Partnership's employer identification number |
| B | Partnership's name, address, city, state, and ZIP code |
| C | IRS Center where Partnership filed return |
| D | ☐ Check if this is a publicly traded partnership (PTP) |

| Part II | Information About the Partner |
|---|---|
| E | Partner's identifying number |
| F | Partner' name, address, city, state, and ZIP code |
| G | ☐ General partner or LLC member-manager    ☐ Limited partner or other LLC member |
| H | ☐ Domestic partner    ☐ Foreign partner |
| I1 | What type of entity is this partner? ________ |
| I2 | If this partner is a retirement plan (IRA/SEP/Keogh/etc.), check here ☐ |
| J | Partner's share of profit, loss and capital (see instructions): |

| | Beginning | Ending |
|---|---|---|
| Profit | % | % |
| Loss | % | % |
| Capital | % | % |

K    Partner's share of liabilities:

| | Beginning | Ending |
|---|---|---|
| Nonrecourse | $ | $ |
| Qualified nonrecourse financing | $ | $ |
| Recourse | $ | $ |

L    Partner's capital account analysis:
- Beginning capital account    $ ______
- Capital contributed during the year    $ ______
- Current year increase (decrease)    $ ______
- Withdrawals & distributions    $( ______ )
- Ending capital account    $ ______

☐ Tax basis    ☐ GAAP    ☐ Section 704(b) book

☐ Other (explain)

M    Did the partner contribute property with a built-in gain or loss?
☐ Yes    ☐ No
If "Yes" attach statement (see instructions)

| Part III | Partner's Share of Current Year Income, Deductions, Credits, and Other Items | | |
|---|---|---|---|
| 1 | Ordinary business income (loss) | 15 | Credits |
| 2 | Net rental real estate income (loss) | | |
| 3 | Other net rental income (loss) | 16 | Foreign transactions |
| 4 | Guaranteed payments | | |
| 5 | Interest income | | |
| 6a | Ordinary dividends | | |
| 6b | Qualified dividends | | |
| 6c | Qualified dividends | | |
| 7 | Royalties | | |
| 8 | Net short-term capital gain (loss) | 17 | Alternative minimum tax (ATM) items |
| 9a | Net long-term capital gain (loss) | | |
| 9b | Collectibles (28%) gain (loss) | | |
| 9c | Unrecaptured section 1250 gain | 18 | Tax-exempt income and nondeductible expenses |
| 10 | Net section 1231 gain (loss) | | |
| 11 | Other income (loss) | | |
| | | 19 | Distributions |
| 12 | Section 179 deduction | 20 | Other information |
| 13 | Other deductions | | |
| 14 | Self-employment earnings (loss) | | |

*See attached statement for additional information.

For IRS Use Only

For Paperwork Reduction Act Notice, See Instructions for Form 1065. WWW.irs.gov/From 1065 Cat. No. 11394R Schedule K-1 (From 1065) 2018

*FIG. 1*
*(Prior Art)*

| 16 A | Foreign transactions VARIOUS |
|---|---|
| B | 154,744 |
| C | 504,287 |
| D | 34,201 |
| E | 6,722 |
| F | 1,104 |
| | STMT |

*FIG. 2*
*(Prior Art)*

LINE 16 - FOREIGN TRANSACTIONS

| | |
|---|---:|
| G - INTEREST EXPENSE | 3,051 |
| H - OTHER | 275,915 |
| I - PASSIVE CATEGORY | 10,922 |
| J - GENERAL CATEGORY | 3,301 |
| K - OTHER | 777 |
| L - TOTAL FOREIGN TAXES PAID | 703 |
| M - TOTAL FOREIGN TAXES ACCRUED | 214 |

```
{
    "formtype" : "1065 ",
    "year" : 2018,
    "parts" [
        {
            "part" : 3,
            "items" : [
                {
                    "id" : "13",
                    "title" : "other deduction",
                    "value" : null,
                    "details" : [
                        {
                            "id" : "A",
                            "title" : "cash contributions (50%)",
                            "value" : "860",
                            "conf" : 0.789,
                            "details" : [
                                {
                                    "id" : null,
                                    "title" : "from pass-through entities",
                                    "value" : "860",
                                    "conf" : 0.123
                                },
                                {
                                    "id" : null,
                                    "title" : "total box A",
                                    "value" : "860",
                                    "conf" : 0.456
                                }
                            ]
                        }
                    ]
                }
            ]
        }
    ]
}
```

*FIG. 10*

MACHINE LEARNING SYSTEM FOR SUMMARIZING TAX DOCUMENTS WITH NON-STRUCTURED PORTIONS

RELATED APPLICATIONS

This is a continuation application of U.S. patent application Ser. No. 16/571,775, filed Sep. 16, 2019, for a "Machine Learning System For Summarizing Tax Documents With Non-Structured Portions" (now U.S. Pat. No. 11,941,706), which is hereby incorporated by reference in its entirety.

BACKGROUND

Figure 2:
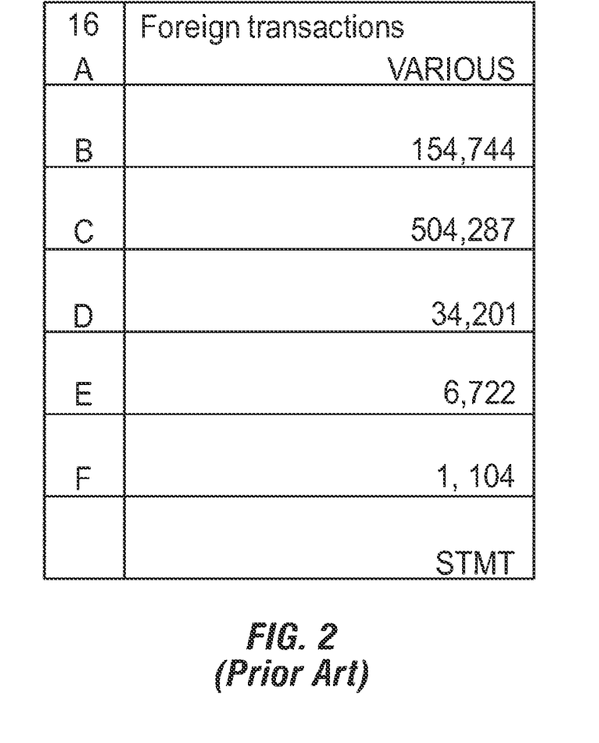
Figure 3:
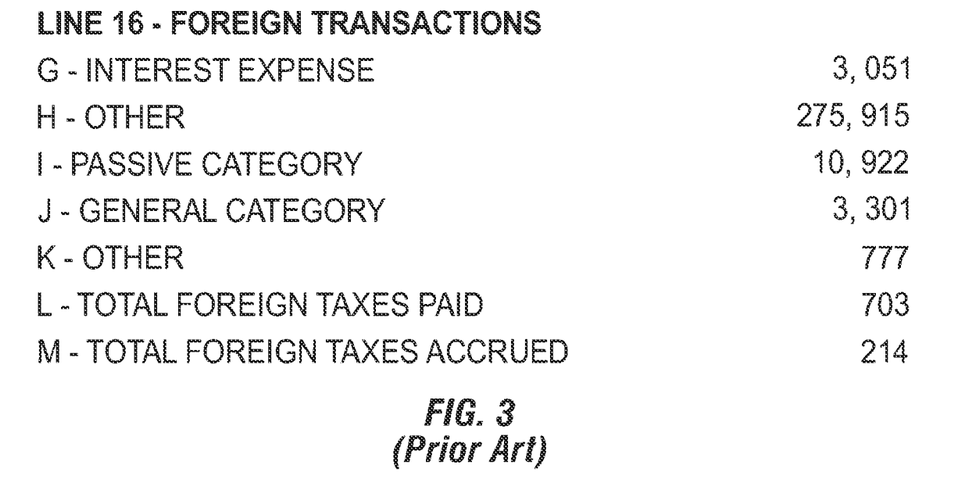
FIG. 3 is a portion of a whitepaper statement with supplemental information corresponding to Box 16 shown in FIG. 2.

Each year in the United States, roughly 27 million Schedules K1 are distributed from about 4 million partnerships. A Schedule K1 comprises a 1-page IRS form, which is often called a "face page," and frequently more than 50 pages of free-form, whitepaper statements that describe the federal, state and international income tax and filing requirements of a partner. FIG. 1 shows an example, blank K1 face page, which contains the majority of the structured information. Each of the highlighted boxes (Part I, Boxes A-D, Part II, Boxes E-M, and Part III, Boxes 1-20) in FIG. 1 need to be extracted and structured for analysis. However, one complexity is that some highlighted boxes can have too much detail to fit on this face page, so the remaining information exists in the unstructured, whitepaper sections of the document. FIG. 2 shows an example in which Box 16 of a K1 face page is filled with foreign transactions A-F, along with a note of "STMT." The note "STMT" means that foreign transaction information on the face page is incomplete, and thus, a user would need to find the corresponding section in the whitepapers to get the remaining details regarding Box 16 (foreign transactions). FIG. 3 shows an example portion of a whitepaper corresponding to Box 16 (foreign transactions) filling in details for remaining foreign transactions G-M.

Because there is no standardization of Schedule K1 packets, which includes the unstructured whitepaper sections, typical scanning mechanisms do not work. Current processing for these types of documents involves a human reviewing the Schedule K1 packet, typically in PDF form, and hand-typing information into their processing software. This becomes especially time consuming when there are roll-up organizations, where various K1s are needed to be combined to then generate a new K1. Because of this issue, organizations could have the need to review and extract information from thousands of K1s in a manual process, which can be error-prone. While the information on the face page of the K1 is fairly standardized, most of the information, and therefore resulting time and complexity, exists in the subsequent, unstructured whitepaper sections of the K1. Therefore, there is a need for a system that overcomes these issues.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 1 is an example blank tax document in the form of a Schedule K-1 (Form 1065);

FIG. 2 is a portion of the Schedule K-1 shown in FIG. 1 with Box 16 filled in;

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 4:
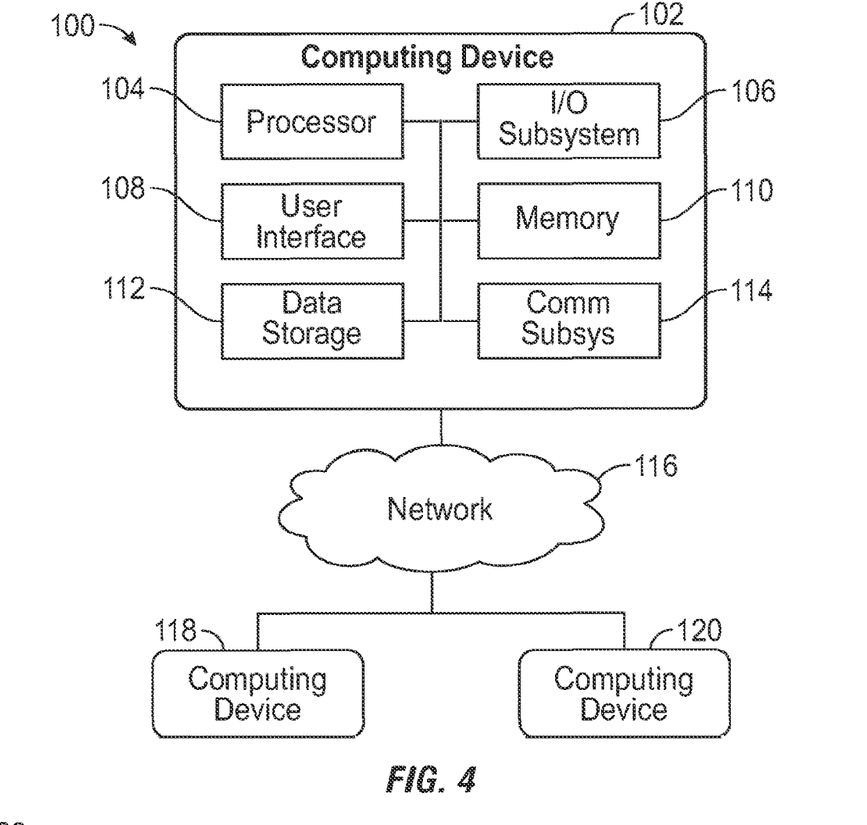
FIG. 4 is a simplified block diagram of at least one embodiment of a system for summarizing tax documents with a non-standardized portion.

Referring now to FIG. 4, there is a system 100 for summarizing tax documents with one or more non-standardized portions, such as a K1 face page with accompanying whitepaper statement(s). As discussed herein, the computing device 102 includes a machine learning (ML) feature that is able to extract every field needed from a K1, including the targeted data elements from whitepaper statement(s), into a structured consumable format that can be imported to other mediums. One purpose of this ML-powered feature is to help save time extracting K1 data by converting unstructured, free-form information from text-embedded and scanned forms into structured data. The ML feature will help eliminate the human time, variability, and errors by predicting, returning, and giving a confidence level score on K1 data in a given form. Users would then be empowered to make a decision based on the machine's confidence level: whether given fields need additional review, or if large sections of K1s can be passed along without further effort. Any mistakes made by the ML model would be logged and delivered back in a feedback loop for continuous training. In some embodiments, the system therefore still uses a human-in-the-loop approach, rather than full automation, and is described later in the threshold predictions section.

In some embodiments, the ML techniques used in the system may be broadly categorized as computer vision or natural language processing techniques. Computer vision is a subdomain of machine learning that encompasses analysis, inference, transformation, or description of image-based information. Natural language processing is a subdomain of machine learning with techniques for computer modeling of natural language (e.g., text intended for human consumption). Techniques from both domains may be used throughout the system, such as: (1) pipeline components utilizing computer image manipulation for "pre-processing" of input K1 files to render them suitable for subsequent modeling tasks; (2) image classification modeling techniques (such as convolutional neural nets) for optical character recognition and other types of content identification; (3) general geometric techniques (such as singular value decomposition) to capture structural information (e.g. page type, layout) related to page and document content; (4) predictive and descriptive language modeling techniques (such as variants of hidden Markov models, convolutional and recurrent neural networks, n-gram models, word embeddings, etc.) to determine the arrangement and semantic content of text in the filing documents, and select numeric quantities for extraction; and (5) post-processing and "cleaning" techniques to correct for any errors in the data extraction process (such as formatting issues in the raw text, or common mistake patterns in the optical character recognition).

In the embodiment shown, the ML feature of the computing device 102 may be accessed by a first computing device 118 and a second computing device 120 by communicating over a network 116. For example, the first and/or second computing devices 118, 120 could access the ML feature of the computing device 102 through a portal and/or an application programming interface (API). The first and/or second computing devices 118, 120 could transfer one or more K1s to the computing device 102, which could extract every field needed from the K1s, including the whitepaper statement(s), into a structured consumable format, such as electronic interchange format, that can be imported to systems on the first and/or second computing devices 118, 120.

The computing device 102 may be embodied as any type of computation or computer device capable of performing the functions described herein, including, without limitation, a computer, a server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. As shown in FIG. 1, the computing device 102 illustratively includes a processor 104, an input/output subsystem 106, a user interface 108, a memory 110, a data storage device 112, a communication subsystem 114, and/or other components and devices commonly found in a server or similar computing device. Of course, the computing device 102 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 110, or portions thereof, may be incorporated in the processor 104 in some embodiments.

The processor 104 may be embodied as any type of processor capable of performing the functions described herein. The processor 104 is illustratively a multi-core processor, however, in other embodiments the processor 104 may be embodied as a single or multi-core processor(s), digital signal processor, microcontroller, or other processor or processing/controlling circuit. Although illustrated as including a single processor 104, in some embodiments the computing device 102 may be embodied as a multi-socket server with multiple processors 104.

The user interface 108 may be embodied as any type of interface in which a user can interact with the computing device 102 to perform one or more functions described herein. The interface could include a graphical user interface. In some embodiments, the user interface 108 could include one or more hardware and/or software interfaces to make adjustments to the computing device and/or interact with the software executing thereon.

The memory 110 may be embodied as any type of volatile or non-volatile memory or data storage capable of performing the functions described herein. In operation, the memory 110 may store various data and software used during operation of the computing device 102 such operating systems, applications, programs, libraries, and drivers. The memory 110 is communicatively coupled to the processor 104 via the I/O subsystem 106, which may be embodied as circuitry and/or components to facilitate input/output operations with the processor 104, the memory 110, and other components of the computing device 102. For example, the I/O subsystem 106 may be embodied as, or otherwise include, memory controller hubs, input/output control hubs, sensor hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 106 may form a portion of a system-on-a-chip (SoC) and be incorporated, along with the processor 104, the memory 110, and other components of the computing device 102, on a single integrated circuit chip. Similarly, the data storage device 112 may be embodied as any type of device or devices configured for short-term or long-term storage of data such as, for example, memory devices and circuits, memory cards, hard disk drives, solid-state drives, non-volatile flash memory, or other data storage devices.

The computing device 102 also includes the communication subsystem 114, which may be embodied as any communication circuit, device, or collection thereof, capable of enabling communications between the computing device 102 and other remote devices over the computer network 116. For example, the communication subsystem 130 may be embodied as or otherwise include a network interface controller (NIC) or other network controller for sending and/or receiving network data with remote devices. The NIC may be embodied as any network interface card, network adapter, host fabric interface, network coprocessor, or other component that connects the computing device 102 to the network 116. The communication subsystem 114 may be configured to use any one or more communication technology (e.g., wired or wireless communications) and associated protocols (e.g., Ethernet, InfiniBand®, Bluetooth®, Wi-Fi®, WiMAX, 3G, 4G LTE, etc.) to effect such communication. In some embodiments, the communication subsystem 114 may form a portion of a SoC and be incorporated along with the processor 104 and other components of the computing device 102 on a single integrated circuit chip.

The computing device 102 may further include one or more peripheral devices. The peripheral devices may include any number of additional input/output devices, interface devices, and/or other peripheral devices. For example, in some embodiments, the peripheral devices may include a touch screen, graphics circuitry, a graphical processing unit (GPU) and/or processor graphics, an audio device, a microphone, a camera, a keyboard, a mouse, a network interface, and/or other input/output devices, interface devices, and/or peripheral devices.

Figure 5:
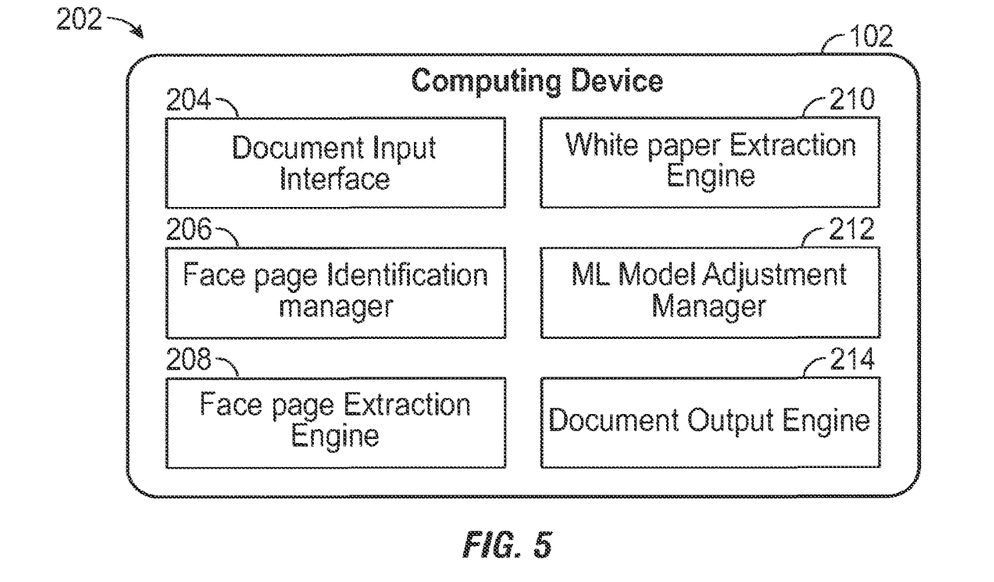
FIG. 5 is a simplified block diagram of at least one embodiment of various environments of the system of FIG. 1.

Referring now to FIG. 5, in an illustrative embodiment, the computing device 102 establishes an environment 202 during operation to extract data from tax documents, including non-standardized portions, and output a document in a standardized format that represents the extracted data. The illustrative environment 202 includes document input interface 204, a facepage identification manager 206, a facepage extraction engine 208, a whitepaper extraction engine 210, a ML model adjustment manager 212, and a document output engine 214. As shown, the various components of the environment 202 may be embodied as hardware, firmware, software, or a combination thereof. As such, in some embodiments, one or more of the components of the environment 202 may be embodied as circuitry or collection of electrical devices. It should be appreciated that, in such embodiments, one or more of the document input interface 204, facepage identification manager 206, facepage extraction engine 208, whitepaper extraction engine 210, a ML model adjustment manager 212, and document output engine 214 may form a portion of the processor 104, the I/O subsystem 106, and/or other components of the computing device 102. Additionally, in some embodiments, one or more of the illustrative components may form a portion of another component and/or one or more of the illustrative components may be independent of one another.

The environment 202 could be deployed as packaged software such that one or more components could be exposed for human and/or programmatic interaction. For example, the environment 202 could be deployed using a container platform by Docker™ by Docker, Inc. of San Francisco, California and Kubernetes™, an open source container orchestration system available at kubernetes.io, to provide isolated virtual execution environments for various components of the environment 202. However, without loss of generality, other implementations (including but not limited to virtual machine appliances, application-level virtualization, or cloud function-as-a-service systems such as Amazon Lambda™ and Google Cloud™ Functions) may also be substituted.

In some embodiments, the environment 202 provides a collection of concurrently executing functional components exchanging data using a communication interface. Each system component could be managed using a component management framework. For example, each functional component can be delivered as a containerized process using Docker™. These components may expose an interface to enable the exchange of information over a network connection, such as a RESTful API. In some embodiments, the collection of container components can be managed as a single system by using a component management system, such as the Kubernetes™ container orchestration system. In some embodiments, the environment 202 exposes an interface to enable data ingress and egress from both human and programmatic sources. For example, the environment 202 may expose a RESTful API following a common standard (such as the OpenAPI standard) to allow other applications and human users to interact with the environment 202. In some embodiments, for example, the document output engine 214 could provide a standard, structured data format for parsed K1 files is described in more detail below.

The document input interface 204 is configured to receive K1 documents as an input and pass the documents to other components of the environment 202 in a format in which the text content of the K1 document is readable. The document input interface 204 handles documents in a variety of formats depending on the format in which the document is received. Broadly, these documents may be either "text-embedded" or "scanned."

Text-embedded documents are documents delivered in an electronic form that contain the text content of the K1 filing encoded in an electronic, computer-readable format (such as HTML, a Microsoft Word document, or some PDF documents). In this case, no extra effort is required for the document input interface 204 to read the text contained in the document.

Scanned documents are documents that do not contain embedded text. These documents may be the result of a computer scan of a printed document or digital photograph. In this case, text content cannot be directly extracted from the document format. Instead, the document input interface 204 uses optical character recognition (OCR), a computer vision technique, to map the images in the scanned document to textual data. Regardless of whether the document received by the document input interface 204 is a "text-embedded" or "scanned" document, the document input interface 204 makes available to other components of the system a document in which the text content of the K1 filing is readable.

The facepage identification manager 206 is configured to identify the facepage from other sections of the K1 document. As discussed above, K1 documents include two parts: a "facepage" which follows a standard format based on an IRS template, and accompanying "whitepaper statements" embellishing the facepage information with additional statement details. Because of the significant format and content differences between the facepage and other sections of the document, a separate component model is used to identify and extract the desired information from the facepage. Once the facepage identification manager 206 has identified which portion of the K1 document is the facepage, the facepage content is passed to separate components in the reader pipeline (the "facepage pipeline").

Subsequent components in the facepage pipeline, such as the facepage extraction engine 208, are used to extract form data (including filing year and form type), as well as extract information from the facepage itself. A K1 facepage is typically broken into three parts, with parts I and II consisting of information about the partnership and the filing partner, respectively, and part III enumerating the partner's share of income, deductions, credits, and other items. Because the content of these sections differs, the facepage extraction engine 208 segments the facepage by parts, and further subdivides each part into individual boxes for information extraction. The facepage extraction engine 208 then uses information extraction models to extract information from each box and post-process all relevant information.

The whitepaper extraction engine 210 is configured to use machine learning to extract targeted information from the whitepaper portion of the K1 document. Whitepaper statements encompass the non-facepage content of a K1 filing, including (but not limited to) long-form statement details for part III of the facepage, state apportionment and allocation information, foreign disclosures, as well as other information the filer wishes to provide to the IRS. There is no universal standard for format or content in the whitepaper statements. The whitepaper extraction engine 210 uses machine learning techniques, such as computer vision and natural language processing, with rules and heuristics to facilitate identification and retrieval of relevant filing information.

In some embodiments, the whitepaper extraction engine 210 is configured to generate a confidence level for each data element being extracted based on machine learning model(s) that predict how likely the extracted data element is accurate. From an application level requirement, actions are only meant to be automated when the whitepaper extraction engine is highly confident in the recommended action. For this reason, the combination of models used must be able to result in some type of probability measurement of a given prediction, either individually, or when combined to a voting scheme. While all models define and calculate this differently, the following example explains that for the probability calculation from the output of the random forest algorithm, which highlights the similarity of a simple voting scheme where multiple of the above approaches are combined.

At a high level, a random forest is a set of decision trees that are different from each other. After the model is trained, a new observation is predicted against by going through each decision tree to get a resulting predicted classification. The counts for each classification are totaled for that given observation, and divided by the total number of trees. Each decision tree likely will not have the same predicted outcome, which is one of the points of the derivation of the random forest algorithm. As an example, a model consists of 10 trees and four possible outcomes (A, B, C, D). For the first object that was predicted against, six trees resulted in an A classification, three resulted in a B classification, and one in a D classification. The respective probabilities for these predictions would then be 60%, 30%, 0%, and 10%. This would act as the output to the model. The whitepaper extraction engine 210 would then only keep the highest predicted percentage and classification, resulting in a prediction of classification A at 60% for the above example. Determining if this prediction should be reassigned to the low confidence indicator and sent for human review depends on the tuning of the specific model and prediction threshold, as described below.

Figure 8:
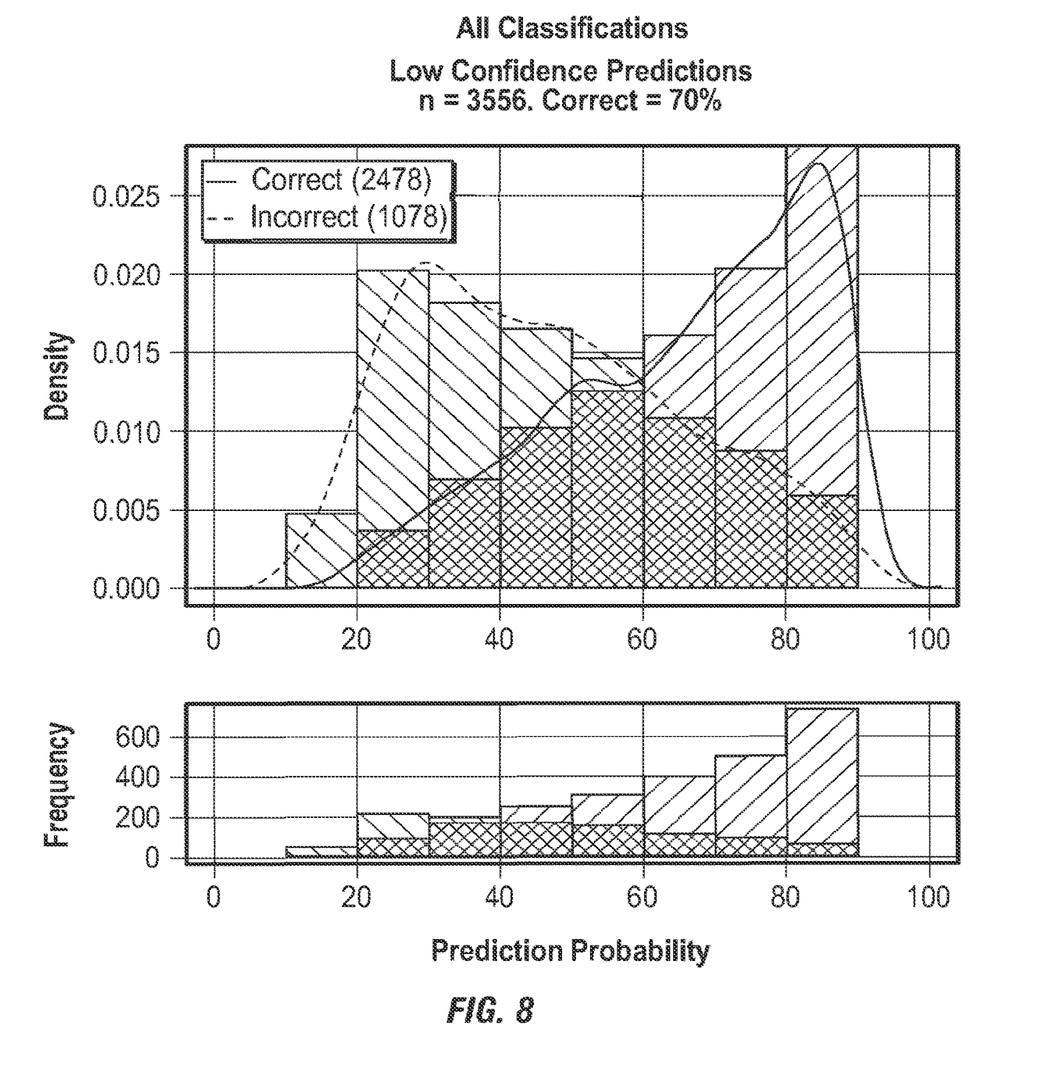
FIGS. 8 and 9 are charts showing example confidence levels during training of the machine learning model.
Figure 9:
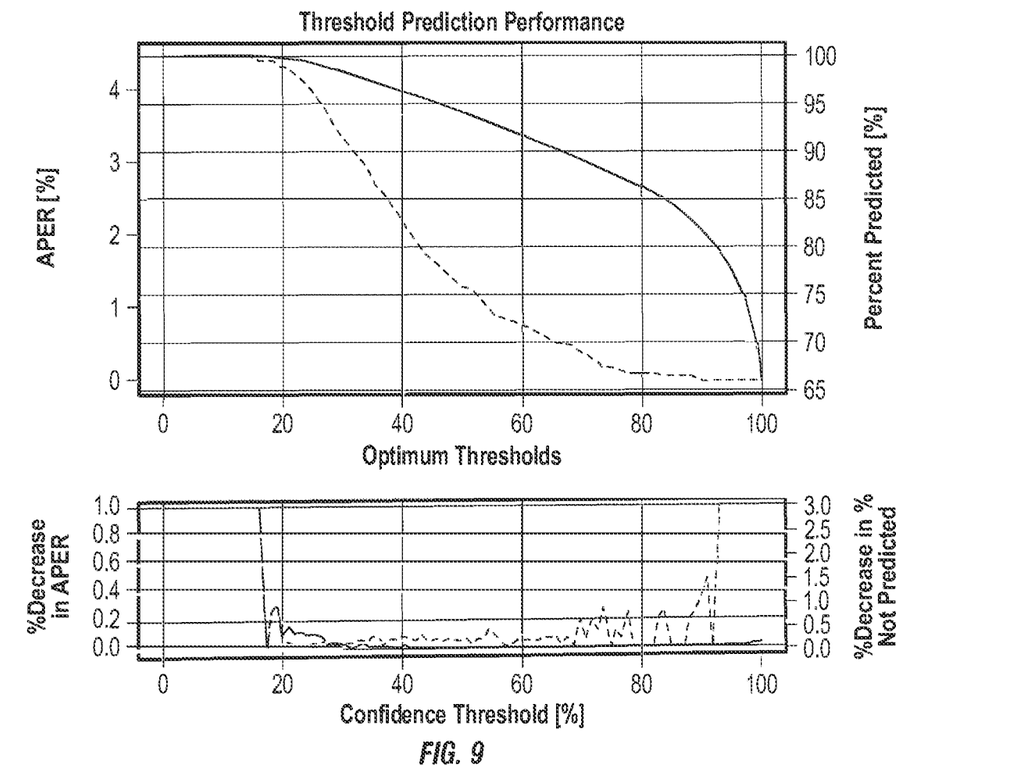

The prediction threshold depends not only on the model performance statistics, but also the application preferences. During the initial training of the model, plots like that of FIGS. 8 and 9 are created and studied in classification cases to recommend the optimal threshold that minimizes the overall error, maximizes the amount of data predicting against (percentage falling above the prediction threshold so a low confidence indicator will not be assigned), and balancing additional statistics and measures for the overall data set, and within each classification. Some of the additional statistics common for classification groups, i, in various sections include:

$$\text{Sensitivity}_i = \frac{(\text{Predicted Correct})_i}{(N \text{ Actual})_i}$$

$$FPR'_i = \frac{(\text{Predicted Wrong})_i}{(N \text{ Actual})_i}$$

$$FNR_i = \frac{\text{Missed Prediction}}{(N \text{ Actual})_i}$$

$$FDR_i = \frac{(\text{Predicted Wrong})_i}{(N \text{ Predicted})_i}$$

The ML model adjustment manager 212 is configured with user feedback capability to automatically improving the predictive capabilities of the whitepaper extraction engine 210. This allows the algorithms used to improve and reinforce themselves based on what a user has confirmed is and is not correct extracted values. During the user's investigation of various confirmed and/or low confidence values extracted, they have the ability to make the decision to confirm or correct that value. After enough feedback has been recorded, various sets of models involved in the particular section of the document for extraction will initiate a reinforcement learning call to update the models. This is a targeted update since various models in the system are only targeting specific pieces of the K1 document. So if there is substantial feedback in a section dealing with the state apportionment section but not for the federal facepage section, for example, that will initiate a reinforcement learning call for only the state apportionment section.

When the human made a different decision for a particular extracted value, an indicator is set so the specific value can be used for feedback learning to improve the model performance. With any ML model built off of survey data (as opposed to sensor data) where the human took part in the original construction of the data set, there are opportunities for errors, or in the case here, incorrectly extracted information from a K1 document. When the ML model is built, it learns from this information, and in the presence of errors, would learn those incorrect processes, thus the need for this improvement process.

This functionality also enables the system to easily learn and adapt to forms that may have minor changes through form year, where a box label might be called a different name or show up in a different location in the subsequent year. Each of the various ML models used in this system have slightly varying approaches to how they are able to improve. A general approach that is common to the majority in this system is that new data is passed through the original model, but with the corrected target label. The original model weights are fixed, to preserve the majority of the model, except a certain portion of the model weights are allowed to move so that it can adjust to the new target values. This also allows for not needing to use the original training data again or to completely recreate a new model to get to the new outputs.

Before implementing the updated model, a score is calculated to determine if the new model is better than the old. This score uses statistics from how the model performs against some known data, and commonly calculated through the use of another supervised machine learning model of a logistic regression form, shown by the equation below, where the 6 indicates the change in the statistic from the original model.

$$logit\left(\frac{\hat{s}_t}{1-\hat{s}_t}\right) = \sum_j W_j \beta_j X_{ij} X_j \in (\delta_{APER}, \delta_{FPR}, \delta_{percT})$$

$$\hat{s}_t = \frac{e^{(\beta_0 + W_1 \beta_1 \delta_{APER} + W_2 \beta_2 \delta_{FPR} + W_3 \beta_3 \delta_{percT})}}{1 + e^{(\beta_0 + W_1 \beta_1 \delta_{APER} + W_2 \beta_2 \delta_{FPR} + W_3 \beta_3 \delta_{percT})}}$$

In addition, there is a weight parameter, W, that allows further customization to specify if a certain increase in performance based on one statistic means more to them than others. For example, one client might say a 0.01% decrease in model accuracy is acceptable if there is an increase of 5% of the values that can then be extracted. Other clients might be comfortable with a 0.1% decrease in accuracy to get 5% more extracted.

The document output engine 214 is configured to generate an electronic document corresponding to the K1 filing, including the unstructured whitepaper portion, in a standard format. As described above, outside of the face page, K1 filing documents do not follow a universal template. Additionally, there is no common interchange format for exchanging K1 filing information electronically. The document input interface 204 described above ingests K1 documents in any format, but the document output engine 214 produces output in a machine-readable form. The output structure defines a standard format for electronic interchange of K1 data, including consumption by third-party applications.

Broadly, there are two aspects of the output format for the document output engine 214: data schema, and encoding. The data schema describes the content, structure, and datatype of the fields returned by the document output engine 214. The choice of encoding controls how that data is represented in computer memory. Note that the same data schema may be used with multiple encoding formats.

The document output engine 214 may be configured to use many common encoding formats. By way of example only, one such encoding format could be Javascript Object Notation (JSON). JSON is a lightweight text-based format commonly used in web applications and supported across a variety of programming languages. Another possible format is "YAML Ain't Markup Language" (YAML), which is a superset of the JSON format with additions designed to improve human readability. Yet another common encoding format that could be used by the document output engine 214 is extensible markup language (XML). For clarity, the subsequent discussion includes examples using the JSON format; however, the document output engine 214 may be configured to use any of above-mentioned encoding formats as well as other structured data encoding methods (such as Avro).

Some encoding formats (such as JSON) do not include type constraints or embedded data schemata. The document output engine 214 may be configured to support various schema systems to document the output data structure. For example, the OpenAPI standard may be used to document and enforce type constraints on the output data. For example, the document output engine 214 could use a data schema organized as a nested structure containing the one or more of the follow elements: (1) top-level fields such as form year, entity name, investor name, filing date, etc.; (2) an array of "parts" corresponding to the three primary components of the filing in which each "part" structure contains substructures describing specific extracted content (e.g., line item values, corresponding subtotals extracted from the statement details, and so on); and (3) additional extracted fields such as state apportionment, UBTI data, foreign disclosures, and other information, that are not captured in the substructures of the primary components of the filing described above.

Figure 10:
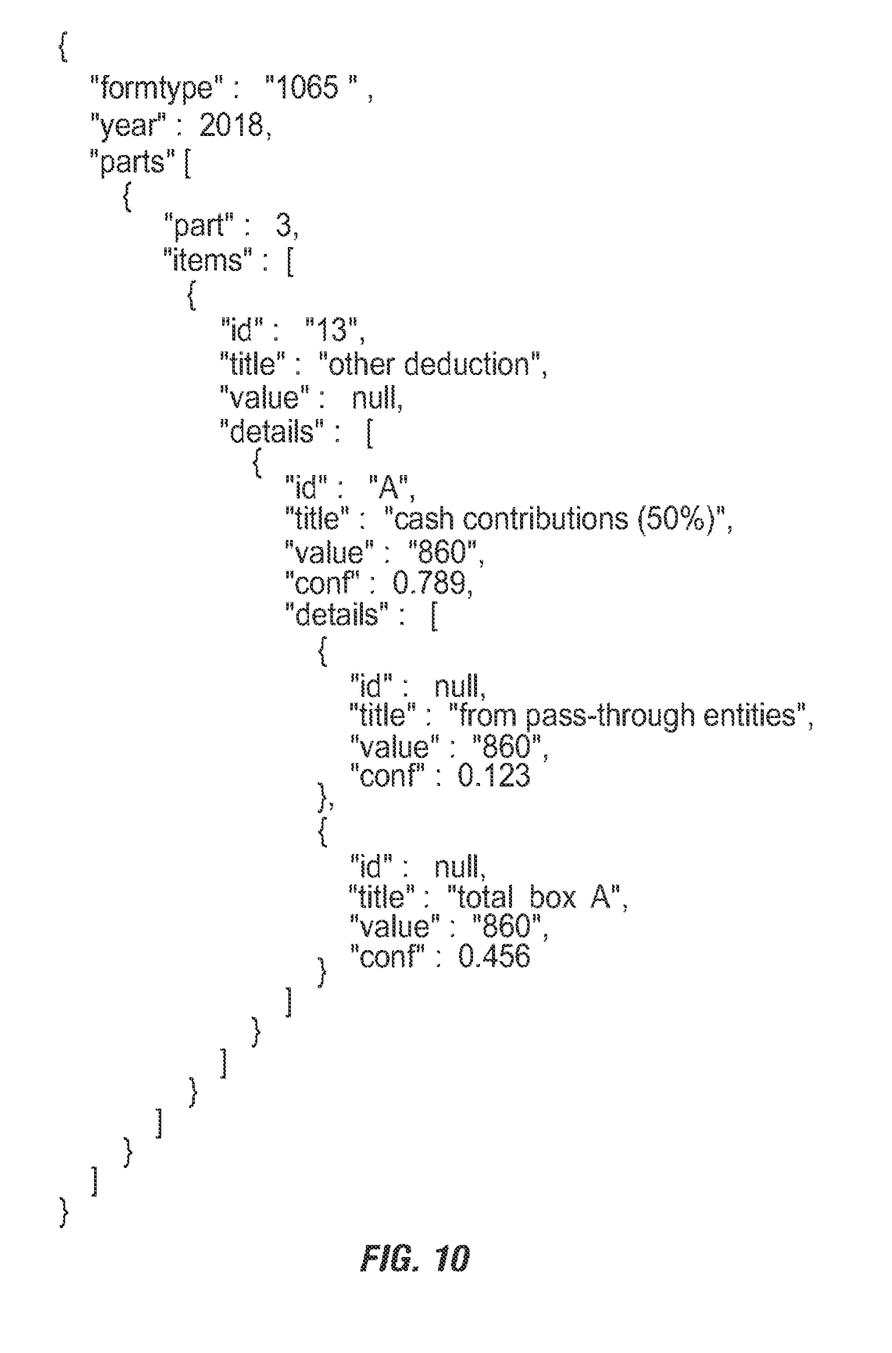
FIG. 10 is a sample snippet showing an example output of the system in an electronic interchange format.

FIG. 10 is an example snippet of output from the document output engine 214 using JSON encoding. Many fields have been omitted from the example in FIG. 10 for purposes of clarity. Among other fields shown, the example output in FIG. 10 shows a confidence level described as "conf" in the output snippet. As discussed above, this is a prediction by the ML model of the whitepaper extraction engine 210 as to the accuracy of the extracted data.

Figure 6:
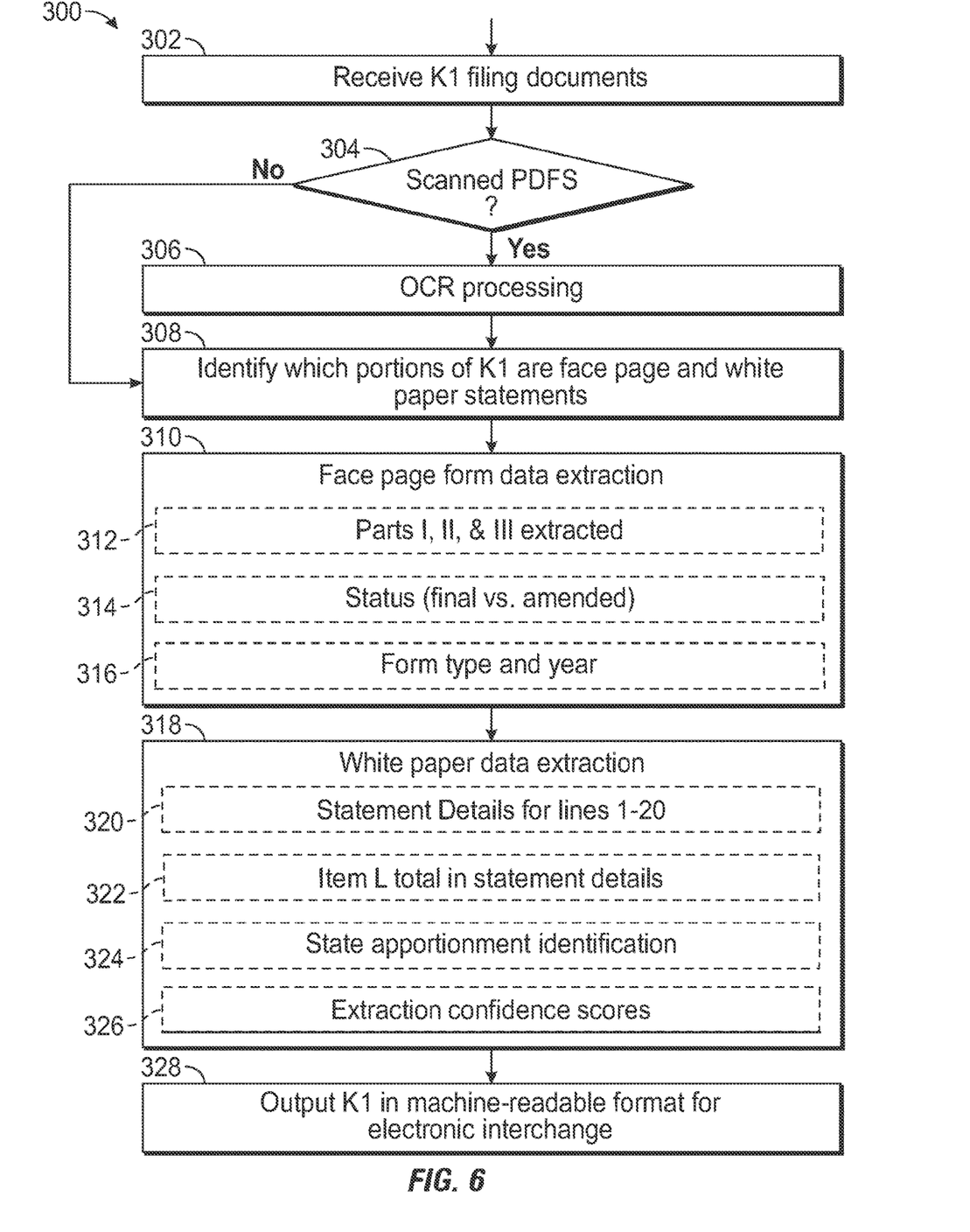
FIG. 6 is a simplified flow diagram of at least one embodiment of a method for extracting data from a tax document that may be performed by the system of FIG. 1.

Referring now to FIG. 6, in use, a computing device 102 may execute a method 300 for summarizing tax documents, such as K1 filings, including the unstructured whitepaper portion. It should be appreciated that, in some embodiments, the operations of the method 300 may be performed by one or more components of the environment 202 as shown in FIG. 5. The method 300 begins in block 302, in which the device 102 receives one or more K1 filing documents. As discussed above, the K1 filing includes a facepage portion that is based on a standard IRS form, and a whitepaper portion that is generally unstructured in form. In block 304, the device 102 determines whether the documents include text content or are scanned images of the K1 filing. If the documents submitted already include text content, the process 300 advances to block 308. However, if the received documents are images, such as scanned PDFs, the documents undergo optical character recognition (OCR) processing (block 306). Although PDF scans are described for purposes of example, one skilled in the art should appreciate that there are numerous other image formats other than PDF.

The method advances to block 308 in which the device 102 identifies which portion of the K1 is the facepage compared with the whitepaper portion. In block 310, the device 102 extracts the data from the facepage portion, such as Parts I, II, and III (block 312), status information (block 314), and form type and year (316). In block 318, the device 102 also extracts data from the whitepaper portion of the K1, such as statement details for lines 1-20 (block 320), item L total in statement details (block 322), state apportionment identification (block 324), and extraction confidence scores (block 326). Next, the data extracted from the facepage and whitepaper statements are compiled and provided in a machine-readable format for electronic interchange (block 328). As discussed above, one example of the machine-readable format for the output of the device 102 is JSON.

Figure 7:
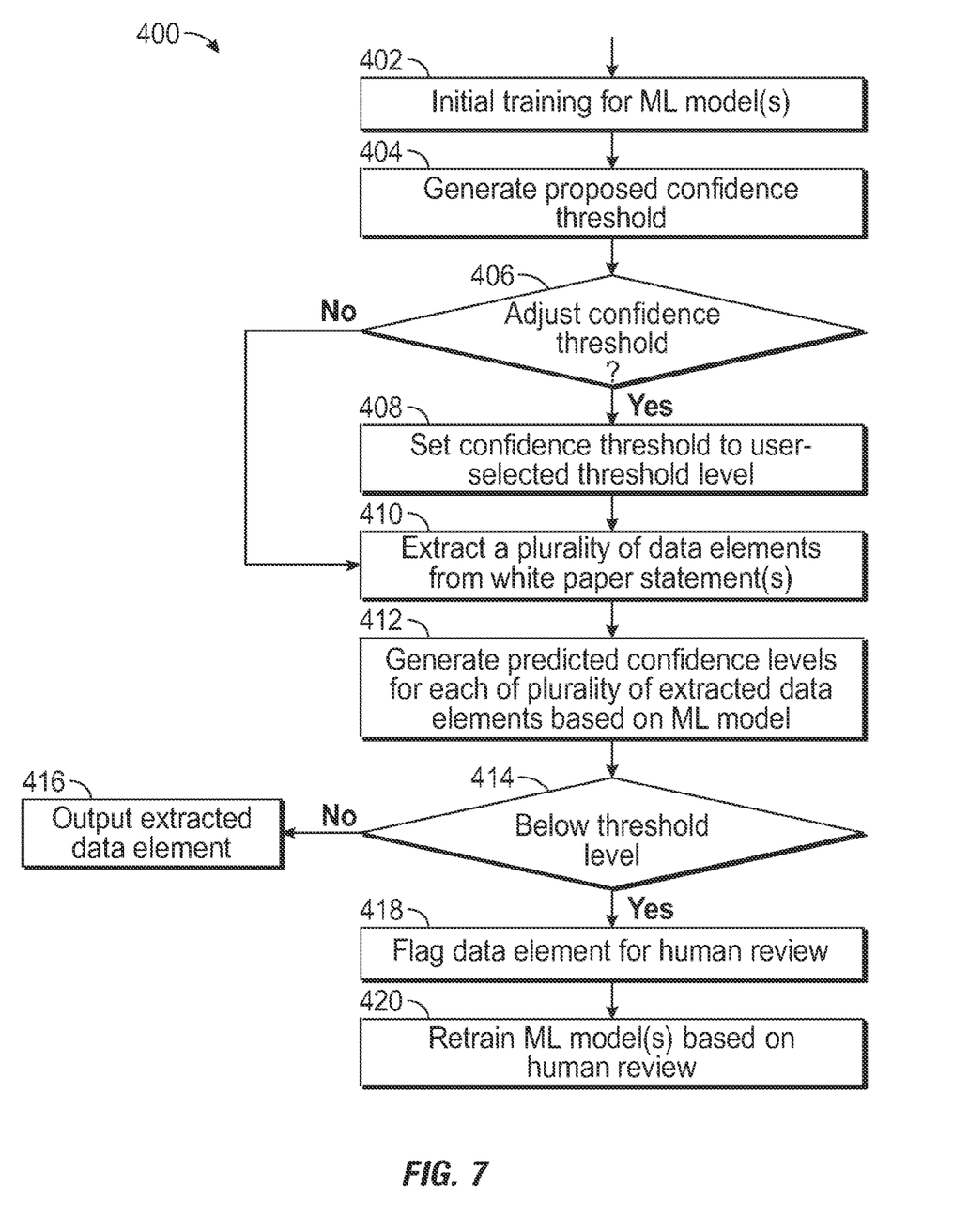
FIG. 7 is a simplified flow diagram of at least one embodiment of a method for making adjustments to the machine learning model that may be executed by the system of FIG. 1.

Referring now to FIG. 7, in use, a computing device 102 may execute a method 400 for adjusting one or more parameters regarding machine learning model(s) that are used to extract data from the K1 documents. It should be appreciated that, in some embodiments, the operations of the method 400 may be performed by one or more components of the environment 202 as shown in FIG. 5. The method 400 begins in block 402, in which the one or more machine learning (ML) models are trained. For example, the models could be trained with historical data extractions performed by humans on K1 documents. Upon training, the models can be used to determine a confidence level threshold as to whether extracted data elements were correctly extracted. As the models are trained, or subsequent thereto, a proposed threshold confidence level can be generated, as discussed above, based on one or more factors (block 404). The method 400 then advances to block 406 in which a determination is made whether the user would like to adjust the confidence threshold. As discussed above, the user's preference on speed vs. quality considerations can be made when setting the confidence threshold. If the user adjusts the threshold, the device 102 sets the confidence threshold to the user-selected threshold (block 408). If there are no adjustments to the proposed confidence threshold, the method 400 advances to block 410. In block 410, a plurality of data elements are extracted from the K1 filing, including the whitepaper statement(s). For each of the data elements, the device 102 generates a confidence level based on the ML model(s) (block 412). Next, the method 400 advances to block 414 in which a determination is made whether the confidence level for the data element is below the threshold. If not, the method 400 advances to block 416, and the data element is outputted. However, if the confidence level is below the threshold, the method 400 advances to block 418, and the data element is flagged for human review and the ML model(s) are retrained (block 420).

It should be appreciated that, in some embodiments, the methods 300 and/or 400, may be embodied as various instructions stored on a computer-readable media, which may be executed by the processor 104, and/or other components of the computing device 102 to cause the computing device 102 to perform the respective method 300 and/or 400. The computer-readable media may be embodied as any type of media capable of being read by the computing device 102 including, but not limited to, the memory 110, the data storage device 112, firmware devices, microcode, other memory or data storage devices of the computing device 102, portable media readable by a peripheral device of the computing device 102, and/or other media.

EXAMPLES

Illustrative examples of the technologies disclosed herein are provided below. An embodiment of the technologies may include any one or more, and any combination of, the examples described below.

Example 1 includes a computing device for summarizing tax documents that include an unstructured portion, the computing device comprising: a document input interface to receive a tax document that includes a structured facepage portion and an unstructured whitepaper portion; a facepage identification manager to identify which portion of the tax document is the structured facepage portion and which portion is the unstructured whitepaper portion; a facepage extraction engine to extract a plurality of structured data elements from the structured facepage portion; a whitepaper extraction engine comprising a machine learning model to: (i) extract a plurality of unstructured data elements from the unstructured whitepaper portion and (ii) generate a confidence level associated with each extracted unstructured data element, wherein the confidence level represents a prediction on how likely the extracted unstructured data element was accurately extracted; a document output engine to generate a document in an electronic interchange format that represents: (i) the plurality of extracted structured data elements from the structured facepage portion; (ii) the plurality of extracted unstructured data elements from the unstructured whitepaper portion; and (iii) the confidence level associated with each of the plurality of extracted unstructured data elements.

Example 2 includes the subject matter of Example 1, wherein the electronic interchange format comprises a data schema that describes one or more of content, structure, or datatype of extracted structured data elements and unstructured data elements.

Example 3 includes the subject matter of Example 2, wherein the electronic interchange format comprises a structured encoding format type.

Example 4 includes the subject matter of Example 3, wherein the encoding format type comprises one or more of JavaScript object notation, YAML ain't markup language, or XML.

Example 5 includes the subject matter of Example 1, further comprising a ML model adjustment manager to establish a confidence level threshold and flag any extracted unstructured data elements with an associated confidence level below the confidence level threshold.

Example 6 includes the subject matter of Example 5, wherein the confidence level threshold is user-adjustable.

Example 7 includes the subject matter of Example 5, wherein the ML model adjustment manager is to automatically retrain the machine learning model with respect to any extracted unstructured data elements with an associated confidence level below the confidence level threshold.

Example 8 includes the subject matter of Example 1, wherein the machine learning model of the whitepaper extraction engine is to extract one or more of state apportionment, UBTI data, or foreign disclosures from the whitepaper portion of the tax document.

Example 9 includes the subject matter of Example 1, wherein the tax document is a K1 tax filing.

Example 10 includes one or more non-transitory, computer-readable storage media comprising a plurality of instructions stored thereon that, in response to being executed, cause a computing device to: receive a tax document that includes a structured facepage portion and an unstructured whitepaper portion; identify which portion of the tax document is the structured facepage portion and which portion is the unstructured whitepaper portion; extract a plurality of structured data elements from the structured facepage portion; extract, using a machine learning model, a plurality of unstructured data elements from the unstructured whitepaper portion; generate, using a machine learning model, a confidence level associated with each extracted unstructured data element, wherein the confidence level represents a prediction on how likely the extracted unstructured data element was accurately extracted; generate a document in an electronic interchange format that represents: (i) the plurality of extracted structured data elements from the structured facepage portion; (ii) the plurality of extracted unstructured data elements from the unstructured whitepaper portion; and (iii) the confidence level associated with each of the plurality of extracted unstructured data elements.

Example 11 includes the subject matter of Example 10, wherein the electronic interchange format comprises a data schema that describes one or more of content, structure, or datatype of extracted structured data elements and unstructured data elements.

Example 12 includes the subject matter of Example 11, wherein the electronic interchange format comprises a structured encoding format type.

Example 13 includes the subject matter of Example 12, wherein the encoding format type comprises one or more of JavaScript object notation, YAML ain't markup language, or XML.

Example 14 includes the subject matter of Example 10, further comprising one or more instructions to establish a confidence level threshold and flag any extracted unstructured data elements with an associated confidence level below the confidence level threshold.

Example 15 includes the subject matter of Example 14, wherein the confidence level threshold is user-adjustable.

Example 16 includes the subject matter of Example 15, further comprising one or more instructions to automatically retrain the machine learning model with respect to any extracted unstructured data elements with an associated confidence level below the confidence level threshold.

Example 17 includes a method for summarizing tax documents that include an unstructured portion, the method comprising: receiving a tax document that includes a structured facepage portion and an unstructured whitepaper portion; identifying which portion of the tax document is the structured facepage portion and which portion is the unstructured whitepaper portion; extracting a plurality of structured data elements from the structured facepage portion; extracting, using a machine learning model, a plurality of unstructured data elements from the unstructured whitepaper portion; generating, using a machine learning model, a confidence level associated with each extracted unstructured data element, wherein the confidence level represents a prediction on how likely the extracted unstructured data element was accurately extracted; generate a document in an electronic interchange format that represents: (i) the plurality of extracted structured data elements from the structured facepage portion; (ii) the plurality of extracted unstructured data elements from the unstructured whitepaper portion; and (iii) the confidence level associated with each of the plurality of extracted unstructured data elements.

Example 18 includes the subject matter of Example 17, wherein the electronic interchange format comprises a data schema that describes one or more of content, structure, or datatype of extracted structured data elements and unstructured data elements.

Example 19 includes the subject matter of Example 18, wherein the electronic interchange format comprises a structured encoding format type.

Example 20 includes the subject matter of Example 19, wherein the encoding format type comprises one or more of JavaScript object notation, YAML ain't markup language, or XML.

Example 21 includes the subject matter of Example 17, further comprising one or more instructions to establish a confidence level threshold and flag any extracted unstructured data elements with an associated confidence level below the confidence level threshold.

Example 22 includes the subject matter of Example 21, wherein the confidence level threshold is user-adjustable.

Example 23 includes the subject matter of Example 22, further comprising one or more instructions to automatically retrain the machine learning model with respect to any extracted unstructured data elements with an associated confidence level below the confidence level threshold.

The invention claimed is:

1. A computing device for summarizing tax documents that include an unstructured portion, the computing device comprising:
   a document input interface to receive a tax document that includes a structured facepage portion and an unstructured free form whitepaper portion;
   a facepage identification manager to identify which portion of the tax document is the structured facepage portion and which portion is the unstructured whitepaper portion;
   a facepage extraction engine to extract a plurality of structured data elements from the structured facepage portion;
   a whitepaper extraction engine comprising a machine learning model to: (i) extract a plurality of unstructured data elements from the unstructured free form whitepaper portion and (ii) generate a confidence level associated with each extracted unstructured data element, wherein the confidence level represents a prediction on how likely the extracted unstructured data element was accurately extracted;
   a document output engine to generate a document in an electronic interchange format that represents: (i) the plurality of extracted structured data elements from the structured facepage portion; (ii) the plurality of extracted unstructured data elements from the unstructured whitepaper portion; and (iii) the confidence level associated with each of the plurality of extracted unstructured data elements;
   a machine learning ("ML") model adjustment manager to establish a confidence level threshold and flag any extracted unstructured data elements with an associated confidence level below the confidence level threshold, wherein the confidence level threshold is user-adjustable;
   wherein the ML model adjustment manager is configured to adjust one or more parameters of the machine learning model by: (i) training and/or re-training the machine learning model based on historical data extractions; (ii) generating, based on the training or re-training, a proposed threshold confidence level as to whether extracted data elements were correctly extracted; (iii) receiving user feedback regarding correction of one or more unstructured data elements; and (iv) adjusting the confidence level based on the user feedback;
   wherein the whitepaper extraction engine is configured to extract a plurality of data elements from the unstructured free form whitepaper portion related to one or more of state apportionment, unrelated business taxable income ("UBTI") data, and/or foreign disclosures from the whitepaper portion of the tax document; and
   wherein the plurality of extracted unstructured data elements in the electronic interchange format are organized into a data schema with: (1) one or more top-level fields including a form year, an entity name, an investor name or a filing date; (2) an array of data corresponding to one or more parts of the tax document; and (3) additional extracted fields including (a) state apportionment data, (b) unrelated business taxable income ("UBTI") data, and/or (c) foreign disclosures data.

2. The computing device of claim 1, wherein the electronic interchange format comprises a data schema that describes one or more of content, structure, or datatype of extracted structured data elements and unstructured data elements.

3. The computing device of claim 2, wherein the electronic interchange format comprises a structured encoding format type.

4. The computing device of claim 3, wherein the encoding format type comprises one or more of JavaScript object notation or a human-readable data serialization language.

5. The computing device of claim 1, wherein the machine learning ("ML") model adjustment manager is to retrain the machine learning model with respect to any extracted unstructured data elements with an associated confidence level below the confidence level threshold.

6. The computing device of claim 1, wherein the tax document is a schedule K1 packet.

7. One or more non-transitory, computer-readable storage media comprising a plurality of instructions stored thereon that, in response to being executed, cause a computing device to:
receive a tax document that includes a structured facepage portion and an unstructured free form whitepaper portion;
identify which portion of the tax document is the structured facepage portion and which portion is the unstructured whitepaper portion;
extract a plurality of structured data elements from the structured facepage portion;
extract, using a machine learning model, a plurality of unstructured data elements from the unstructured free form whitepaper portion, wherein the machine learning model is configured to extract a plurality of data elements from the unstructured free form whitepaper portion related to one or more of state apportionment, unrelated business taxable income ("UBTI") data, and/or foreign disclosures from the whitepaper portion of the tax document;
generate, using a machine learning model, a confidence level associated with each extracted unstructured data element, wherein the confidence level represents a prediction on how likely the extracted unstructured data element was accurately extracted;
generate a document in an electronic interchange format that represents: (i) the plurality of extracted structured data elements from the structured facepage portion; (ii) the plurality of extracted unstructured data elements from the unstructured whitepaper portion; and (iii) the confidence level associated with each of the plurality of extracted unstructured data elements
establish a confidence level threshold and flag any extracted unstructured data elements with an associated confidence level below the confidence level threshold, wherein the confidence level threshold is user-adjustable;
adjust one or more parameters of the machine learning model by: (i) training and/or re-training the machine learning model based on historical data extractions; (ii) generating, based on the training or re-training, a proposed threshold confidence level as to whether extracted data elements were correctly extracted; (iii) receiving user feedback regarding correction of one or more unstructured data elements; and (iv) adjusting the confidence level based on the user feedback; and
wherein the plurality of extracted unstructured data elements in the electronic interchange format are organized into a data schema with: (1) one or more top-level fields including a form year, an entity name, an investor name or a filing date; (2) an array of data corresponding to one or more parts of the tax document; and (3) additional extracted fields including (a) state apportionment data, (b) unrelated business taxable income ("UBTI") data, and/or (c) foreign disclosures data.

8. The one or more non-transitory, computer-readable storage media of claim 7, wherein the electronic interchange format comprises a data schema that describes one or more of content, structure, or datatype of extracted structured data elements and unstructured data elements.

9. The one or more non-transitory, computer-readable storage media of claim 8, wherein the electronic interchange format comprises a structured encoding format type.

10. The one or more non-transitory, computer-readable storage media of claim 9, wherein the encoding format type comprises one or more of JavaScript object notation or a human-readable data serialization language.

11. The one or more non-transitory, computer-readable storage media of claim 7, further comprising one or more instructions to automatically retrain the machine learning model with respect to any extracted unstructured data elements with an associated confidence level below the confidence level threshold.

12. A method for summarizing tax documents that include an unstructured portion, the method comprising:
receiving a tax document that includes a structured facepage portion and an unstructured free form whitepaper portion;
identifying which portion of the tax document is the structured facepage portion and which portion is the unstructured whitepaper portion;
extracting a plurality of structured data elements from the structured facepage portion;
extracting, using a machine learning model, a plurality of unstructured data elements from the unstructured free form whitepaper portion, wherein the machine learning model is configured to extract a plurality of data elements from the unstructured free form whitepaper portion related to one or more of state apportionment, unrelated business taxable income ("UBTI") data, and/or foreign disclosures from the whitepaper portion of the tax document;
generating, using a machine learning model, a confidence level associated with each extracted unstructured data element, wherein the confidence level represents a prediction on how likely the extracted unstructured data element was accurately extracted;
generating a document in an electronic interchange format that represents: (i) the plurality of extracted structured data elements from the structured facepage portion; (ii) the plurality of extracted unstructured data elements from the unstructured whitepaper portion; and (iii) the confidence level associated with each of the plurality of extracted unstructured data elements;
establishing a confidence level threshold and flag any extracted unstructured data elements with an associated confidence level below the confidence level threshold, wherein the confidence level threshold is user-adjustable;
adjusting one or more parameters of the machine learning model by: (i) training and/or re-training the machine learning model based on historical data extractions; (ii) generating, based on the training or re-training, a proposed threshold confidence level as to whether extracted data elements were correctly extracted; (iii) receiving user feedback regarding correction of one or more unstructured data elements; and (iv) adjusting the confidence level based on the user feedback; and
wherein the plurality of extracted unstructured data elements in the electronic interchange format are organized into a data schema with: (1) one or more top-level fields including a form year, an entity name, an investor name or a filing date; (2) an array of data corresponding to one or more parts of the tax document; and (3) additional extracted fields including (a) state apportionment data, (b) unrelated business taxable income ("UBTI") data, and/or (c) foreign disclosures data.

13. The method of claim 12, wherein the electronic interchange format comprises a data schema that describes one or more of content, structure, or datatype of extracted structured data elements and unstructured data elements.

14. The method of claim 13, wherein the electronic interchange format comprises a structured encoding format type.

15. The method of claim 14, wherein the encoding format type comprises one or more of JavaScript object notation or a human-readable data serialization language.

16. The method of claim 12, further comprising one or more instructions to automatically retrain the machine learning model with respect to any extracted unstructured data elements with an associated confidence level below the confidence level threshold.

\* \* \* \* \*